E. JARDINE, J. ARCHER & E. WATCHORN.
VARIABLE SPEED TRANSMISSION GEARING FOR MOTOR CYCLES AND CARS.
APPLICATION FILED SEPT. 7, 1915.
1,177,110. Patented Mar. 28, 1916.
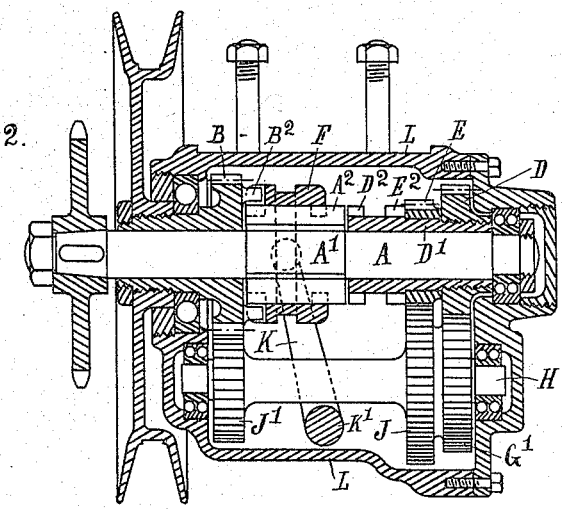
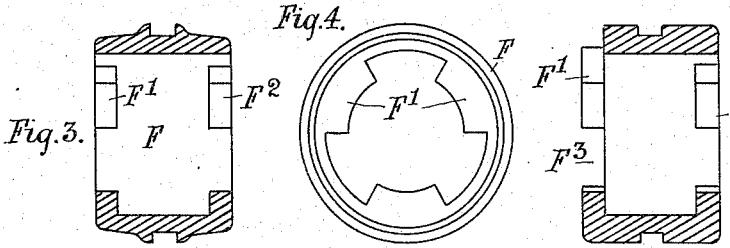
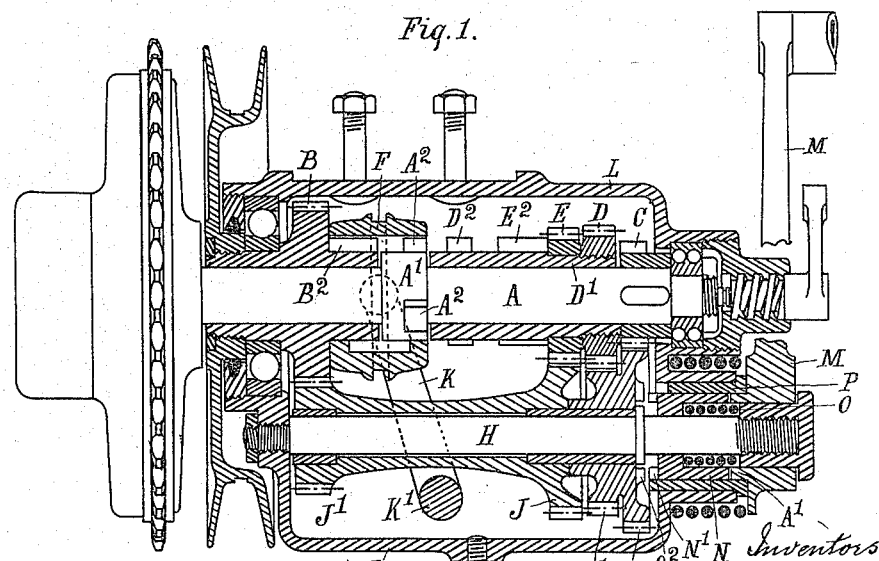

UNITED STATES PATENT OFFICE.

ERNEST JARDINE AND JOHN ARCHER, OF NOTTINGHAM, AND ERNEST WATCHORN, OF COUNTY OF NOTTINGHAM, ENGLAND.

VARIABLE-SPEED TRANSMISSION-GEARING FOR MOTOR CYCLES AND CARS.

1,177,110.

Specification of Letters Patent.

Patented Mar. 28, 1916.

Application filed September 7, 1915. Serial No. 49,382.

*To all whom it may concern:*

Be it known that we, ERNEST JARDINE, JOHN ARCHER, and ERNEST WATCHORN, subjects of the King of Great Britain, and the two first named residents of Nottingham and the last named a resident of the county of Nottingham, in England, have invented a certain new and useful Improvement in Variable-Speed Transmission-Gearing for Motor Cycles and Cars, of which the following is a specification.

This invention relates to improvements in variable speed transmission gearing for motor cycles and cars, of the kind in which the gear wheels are arranged on main and auxiliary shafts, and in which certain of the gear members mounted loosely on the main-shaft are provided with clutches arranged co-axially, and a sliding sleeve with clutches at its ends is provided for connecting the gears to the shaft in the combination required for giving the various speeds.

Referring to the drawings, Figure 1. is a longitudinal section of a four speed gear, and Fig. 2. a longitudinal section of a three speed gear, constructed according to our invention. Fig. 3. is a sectional view, and Fig. 4. an end view of the clutch sleeve. Fig. 5. is a section view of a modified form of clutch sleeve. Figs. 3. to 5. are drawn to a larger scale than Figs. 1. and 2.

Like letters indicate like parts throughout the drawings.

According to the present invention, the main-shaft A is provided with a collar or enlargement $A^1$ having external clutch members $A^2$, and the last gear wheel B, which is mounted loosely on said shaft A at the side of the said collar $A^1$, is provided with corresponding clutch members $B^2$.

In the four speed gear shown in Fig. 1. the opposite end of the main-shaft A to the gear wheel B is provided with a pinion C which is secured to the said shaft. Between this pinion C and collar $A^1$ but close up to the former, is a second gear wheel D which is mounted loosely on the main-shaft A. This wheel D is provided with a long sleeve $D^1$ which extends up to the side of the collar $A^1$ thereon, and it is provided at this point with external clutch members $D^2$ corresponding to those $A^2$ on the collar $A^1$. Mounted loosely on the sleeve $D^1$ described, is a third gear wheel E, which is also provided at its end with clutch members $E^2$ corresponding to those $A^2$ on the collar A.

There are thus four corresponding co-axial male dog clutches arranged side by side, with a space between each clutch, and they are disposed in the following order from left to right as shown in Fig. 1. First the clutch members $B^2$ of the last wheel B of the gear train, second the clutch members $A^2$ on the main-shaft collar or enlargement $A^1$, third the clutch members $D^2$ of the second gear wheel D, and fourth the clutch members $E^2$ of the third gear wheel E. It will also be seen that the end clutch members $B^2$ and $E^2$ of the series are longer than the intermediate ones.

Mounted on the exterior of the clutch members described so that it can slide longitudinally thereon, is a clutch sleeve F (shown detached in Figs. 3. and 4.) which is provided at one end with internal clutch members $F^1$, and at the other end with corresponding clutch members $F^2$. These clutch members constitute two end female clutch members, which are adapted to engage with the male clutch members previously described, and connect different combinations of the latter together.

The clutch sleeve F described is in the arrangement shown in Fig. 1. moved into four different operative positions, and there is a neutral position between each of the former, when the gear is free.

When the clutch F is for example in the first position in which it is shown in the drawings, its clutch members $F^1$ $F^2$ engage respectively with the male clutch members $B^2$, $A^2$, and it then locks the last gear wheel B of the gear train directly to the main-shaft A. In the second position of the clutch sleeve F, that is, when it has been moved far enough to the right for its clutch members $F^2$ to engage with the male clutch members $D^2$, while its other clutch member $F^1$ still remains in engagement with the clutch members $B^2$, the last gear wheel B is locked to the second gear wheel D. In the third position of the clutch sleeve F, that is, when it has been moved farther to the right so that the clutch member $F^2$ is in engagement with the male clutch members $E^2$, the other end clutch member $F^1$ is now in engagement with the clutch members $A^2$, and the third wheel E is locked to the main-shaft A. In the fourth position of the clutch sleeve F, that is when it has been moved farther to the right so that its clutch members $F^1$ $F^2$, engage with the clutch members $D^2$ and $E^2$ respectively, the second and third wheels D and E are locked together. The pinion C on the main-shaft A is permanently geared to the second wheel D on the same shaft, by a pair of gear wheels G $G^1$, mounted loosely on the auxiliary shaft H, but connected to each other. The third wheel E on the main shaft A is permanently geared to the last gear train wheel B on same shaft, by a second pair of wheels J $J^1$, mounted loosely on the auxiliary shaft H.

When the clutch sleeve F is in the first position, the last gear wheel B is locked to the main-shaft A, the drive is therefore direct and the gear runs idle. This gives say the fourth or highest speed.

When the clutch sleeve F is in its second position the drive is through the pinion C on the main-shaft A, the first pair of wheels G $G^1$ on the auxiliary shaft H, and the second wheel D on the main-shaft A, which latter is locked to the last wheel B of the gear train. This gives the third speed.

When the clutch sleeve F is in its third position, the drive is through the third wheel E on the main-shaft A the second pair of wheels J $J^1$ on the auxiliary shaft H, and the last wheel B of the gear train. This gives the second speed.

When the clutch sleeve F is in its fourth position, the drive is through all the gear wheels C G $G^1$ D E J $J^1$ and B. This gives the first or lowest speed.

The clutch sleeve F is moved longitudinally in a well known manner by means of a double ended lever K (see Figs. 1. and 2.) mounted in the interior of the gear casing L. The free end of this lever K engages with the clutch sleeve F while one end of the lever axle $K^1$ is carried through the casing L and is provided with an external arm for making the usual connection with an operating lever placed in a convenient position.

In the gear described, four different speeds are provided for. When however only three speeds are required, the number of members can be reduced, and the clutch sleeves F need only be moved into either of three operative positions, neutral positions being provided between each of the former. In this case the collar or enlargement $A^1$ on the main shaft A (see Fig. 2.) is made longer, so that the external clutch members $A^2$ thereon can be of greater length, and the driving pinion C secured to said shaft A, and the wheel G on the auxiliary shaft H are omitted. The gear wheels $G^1$ on the auxiliary shaft H, is in this case secured to the other two wheels J $J^1$ on the said shaft. When, in this arrangement, the clutch sleeve F is in its first position as shown in Fig. 2, the last wheel B of the gear train is locked to the main-shaft A. This gives the third or highest speed, when the drive is direct and the gear runs idle.

When the clutch sleeve F is in its second position, the gear wheel D is locked to the main-shaft A. This gives the second speed, the drive being through the two gear wheels $G^1$ $J^1$ on the auxiliary shaft H, which connect said driving wheel D to the last gear wheel B on the main shaft.

When the clutch sleeve J is in its third position, the wheel E is locked to the main-shaft A. This gives the third or lowest speed, when the drive is through the two gear wheels J $J^1$ on the auxiliary shaft H, which serve to connect the wheel E to the last gear wheel B on the main shaft.

If preferred the clutch members $B^2$ on the wheel B may be situated at the side as shown in Fig. 5. and the end of the clutch sleeve F is then provided with recesses $F^3$ (see Fig. 5.) between the internal clutch projections $F^1$ for the clutch projection $B^2$ to engage with. Greater strength is thus obtained in the clutch members at this point.

An external lever M (see Fig. 1.) may be mounted on the end of the auxiliary shaft H and a clutch member N be provided for connecting said lever to the end gear wheels G $G^1$ for the purpose of turning the main shaft A and starting the motor. This clutch N is rotatably connected to the boss $A^1$ of the lever A and is provided with clutch teeth $N^1$ to engage with clutch teeth on the gear wheel $G^1$. The clutch N is controlled by the action of a spring O and a cam groove in the fixed surrounding sleeve P. The cam is cut so that the spring O can move the clutch into engagement, when the lever M is moved from its normal position, and withdraws it again when the lever is returned.

The gear described may be arranged so as to provide for the chain or belt connections being either both on one side as shown, or for them to be distributed one on each side as desired.

What we claim as our invention and desire to cover by Letters Patent is:—

1. In variable speed transmission gearing of the countershaft type, the combination, with a main shaft, of a clutch on the main shaft, three gear members one of which is the last member of the gear train mounted loosely on said shaft, an auxiliary shaft, toothed wheels on the auxiliary shaft gearing into the said gear members, clutches on said gear members, and a clutch sleeve adapted to engage with said clutches and arranged to connect the last gear member either to the shaft or to one of the other two gear members, and one of the latter to the shaft or the one to the other, substantially as described.

2. In variable speed transmission gearing of the countershaft type, the combination, with a main shaft, of a clutch on the mainshaft, three gear members one of which is the last member of the gear train mounted loosely on said shaft, clutches on said gear members, a clutch sleeve adapted to engage with said clutches and arranged to connect the last gear member either to the shaft or one of the other two gear members, and one of the latter to the shaft or the one to the other, a gear member secured to the main shaft, an auxiliary shaft, and gear wheels secured together in pairs and mounted loosely on the auxiliary shaft, the wheels of one pair being arranged in gear with two of the said three gear members, and the wheels of the other pair being arranged in gear with the remaining gear member and the said gear member which is secured to the main shaft.

3. In variable speed transmission gearing of the countershaft type, the combination, with a main shaft, of a clutch on the main shaft, three gear members one of which is the last member of the gear train mounted loosely on said shaft, an auxiliary shaft, toothed wheels on the auxiliary shaft gearing into the said gear members, clutches on said gear members, and a clutch sleeve adapted to engage with said clutches and arranged to connect the last gear member or either of the other gear members to the main shaft, substantially as described.

4. In variable speed transmission gearing of the countershaft type, the combination, with a main shaft, of a clutch on the main shaft, three gear members one of which is the last member of the gear train mounted loosely on said shaft, clutches on said gear members, a clutch sleeve adapted to engage with said clutches and arranged to connect the last gear member or either of the other two members to the main-shaft, an auxiliary shaft, and three gear wheels secured together and mounted loosely on the auxiliary shaft and gearing with and connecting the last gear member on the main shaft to either of the other two members on said shaft, substantially as described.

5. In variable speed transmission gearing of the countershaft type, the combination of a main shaft, a series of gear members on said shaft, an auxiliary shaft, a series of gear members on the latter gearing with those on the main shaft, clutch mechanism for connecting the gear members on the main-shaft thereto or to each other, an external lever mounted on the end of the auxiliary shaft, and a clutch for connecting said lever to a gear member on said shaft for the purpose of turning the main-shaft, substantially as described.

In testimony whereof we have signed our names to this specification in the presence of two subscribing witnesses.

ERNEST JARDINE.
  JOHN ARCHER.
  ERNEST WATCHORN.

Witnesses:
 Guy H. Hitch,
 Lucy Anler.

Copies of this patent may be obtained for five cents each, by addressing the "Commissioner of Patents, Washington, D. C."